(No Model.)
J. S. DAVIS.
CARRIER BELT FOR HARVESTERS.
No. 408,654. Patented Aug. 6, 1889.
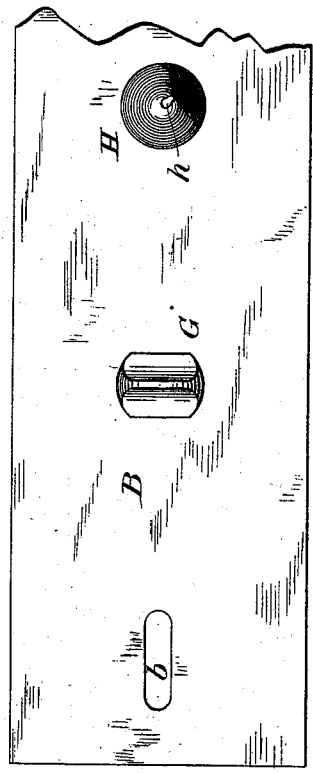
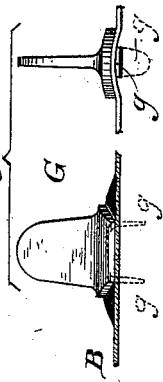
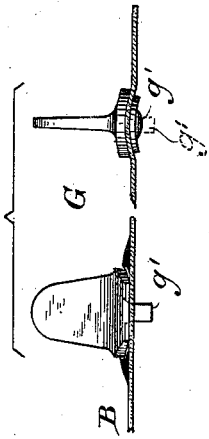
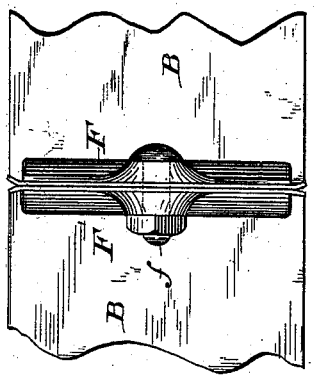
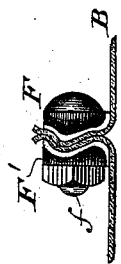
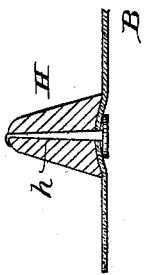
Witnesses
Frank O'Neil.
C. A. Skinkle
Inventor
John S. Davis
By his Attorney
Wm. A. Skinkle

UNITED STATES PATENT OFFICE.

JOHN S. DAVIS, OF CLEVELAND, OHIO, ASSIGNOR TO THE DAVIS PLATFORM BINDER COMPANY, OF SAME PLACE.

CARRIER-BELT FOR HARVESTERS.

SPECIFICATION forming part of Letters Patent No. 408,654, dated August 6, 1889.

Application filed March 30, 1888. Serial No. 268,941. (No model.)

*To all whom it may concern:*

Be it known that I, JOHN S. DAVIS, a citizen of the United States, residing at Cleveland, in the county of Cuyahoga, State of Ohio, have invented certain new and useful Improvements in Carrier-Belts for Harvesters, of which the following is a description.

My invention relates to the carrier-belts of harvesters; and it consists of certain improvements in the spurs or projections attached to the outer faces of the belts and projecting into the layer of straw thereon to force it along.

The accompanying drawings show my improvements as applied to a harvester carrier-belt.

Figure 1 is a plan view, on an enlarged scale, of an end of one of the carrier-belts. Fig. 2 is a plan view of both ends brought together and united by the clamp. Fig. 3 is a side elevation of the same. Figs. 4, 5, and 6 are detailed views of several forms of the belt-spuds I prefer to use.

In Figs. 2 and 3 I show a clamp or clasp for uniting the ends of the carrier-belts. It consists of two blocks or bars of metal F F', correspondingly serrated on their adjacent faces, which are rounded off or flared out at their bottom edges. The ends of the belts B are brought together and turned up between the serrated faces of the bars, which are firmly clamped together by a bolt $f$, passing through the apertures near their centers and through the slots $b$ in the ends of the belts. These slots permit of adjustment in the length of the belts and the "taking up" of any stretch, and they may be made of any desired or necessary length for this purpose. The belt ends are firmly held by frictional contact between the bars, the sinuosity of the space in which they lie adding greatly to the holding-grip of the bars. By this method of clamping the continuity of the inner surface of the belt is preserved and its flexibility unimpaired, thus enabling it to pass smoothly around the smallest of guide-rollers without loss of power or danger of entanglement therewith, while the projection formed by the clamp on the outer surfaces of the belts assists the carrier-spuds in urging the grain along the platform.

At suitable intervals along the centers of the belts are fastened the spuds or projections shown in Figs. 1, 4, 5, and 6. The spuds G (shown in Figs. 1 and 4) are in the form I prefer, and consist, as shown, of metallic pieces cast or stamped from ductile metal and provided with downwardly-projecting pins $g$, to be thrust through suitable apertures in the belts and bent or clamped thereunder, forming a simple and firm connection.

The spud shown in Fig. 5 is provided with a single pin or shank $g'$, which is passed through a thin washer beneath the fabric and there riveted.

Another form of spud H, that I have found useful and cheap, is illustrated in Figs. 1 and 6 as a modification. It consists of a piece of wood turned to the shape shown, having a broad base with conical sides and a rounded top and perforated through its length for the passage of a clout-nail $h$, which also passes through the belt and is clinched over the top of the spud, as shown.

It will be observed that the spuds are rounded or hollowed out in under, so that the edges of their bases are drawn tightly against the fabric and remain so in passing around the rollers, so that no gaps are left into which the straws can fall or become entangled. These spuds, by reason of their rounded or pointed tops and peculiar shape, readily penetrate the sheet of grain as it falls upon the platform, thus getting a firm hold upon and better adapting it to convey the grain—a feature of particular importance in very ripe grain—and, further, by reason of their rounded tops and small size as compared to the width of the belts in the centers of which they are placed, they free themselves more readily from the straws, which they deliver at the stubble end of the platform.

Having thus described my invention, what I claim, and desire to secure by Letters Patent, is—

The combination of a carrier-belt with metal spurs attached at suitable intervals along its length, said spurs being formed with a thin or pointed top and a broad base, which is concaved on its under side and has a ductile-metal pin projecting therefrom, said pin passing through the belt fabric and clinched or riveted on its under side, substantially as hereinbefore set forth.

In testimony whereof I hereto affix my signature in presence of two witnesses.

JOHN S. DAVIS.

Witnesses:
 HENRY W. WELKER,
 A. E. SUMNER.